US011124977B2

(12) United States Patent
Lau et al.

(10) Patent No.: US 11,124,977 B2
(45) Date of Patent: Sep. 21, 2021

(54) SYSTEM AND METHOD FOR CONSTRUCTING A BRICK STRUCTURE WITH A CABLE-DRIVEN ROBOT

(71) Applicant: The Chinese University of Hong Kong, Hong Kong (CN)

(72) Inventors: Darwin Tat Ming Lau, Hong Kong (CN); Adam Fingrut, Hong Kong (CN); Kristof Crolla, Hong Kong (CN); Yeung Yam, Hong Kong (CN); Yuen Shan Chan, Hong Kong (CN); Yulong Wu, Deyang (CN); Man Kit Cheung, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 16/703,268

(22) Filed: Dec. 4, 2019

(65) Prior Publication Data
US 2020/0173186 A1 Jun. 4, 2020

Related U.S. Application Data

(60) Provisional application No. 62/774,953, filed on Dec. 4, 2018.

(51) Int. Cl.
*E04G 21/22* (2006.01)
*B25J 9/00* (2006.01)
*E04B 2/02* (2006.01)

(52) U.S. Cl.
CPC ............ *E04G 21/22* (2013.01); *B25J 9/0093* (2013.01); *E04B 2/02* (2013.01)

(58) Field of Classification Search
CPC ....... E04G 21/22; B25J 9/0093; B25J 15/022; B25J 9/0078; B25J 9/0084; E04B 2/02; E04B 2002/0258; G05B 2219/45086
See application file for complete search history.

(56) References Cited

U.S. PATENT DOCUMENTS

| 704,647 A | * | 7/1902 | Knight | E04G 21/22 52/749.14 |
| 704,648 A | * | 7/1902 | Knight | E04G 21/22 52/749.14 |

(Continued)

FOREIGN PATENT DOCUMENTS

| GB | 1175164 A | * | 12/1969 | E04G 21/22 |
| WO | WO-2009044002 A1 | * | 4/2009 | E04G 21/22 |
| WO | WO-2018009981 A | * | 1/2018 | B25J 9/1674 |

*Primary Examiner* — Jessie T Fonseca
(74) *Attorney, Agent, or Firm* — Saliwanchik, Lloyd & Eisenschenk

(57) ABSTRACT

A robotic constructing system based on a cable-driven robot for constructing a structure formed by objects such as bricks is provided. The process of laying the bricks is performed by the cable-driven robot autonomously. The bricks are provided to the robotic constructing system by an external conveyor and a robot arm of the robotic constructing system is configured to pick up the bricks. The robot arm is then configured to place the bricks in a position to receive an adhesive from an adhesive dispenser of the robotic constructing system and further to load the bricks onto a linear rail. The linear rail can be configured to place the bricks within the proximity of the cable-driven robot. The cable-driven robot can be configured to pick up the bricks and lay the bricks in the designated position of a three-dimensional space.

17 Claims, 14 Drawing Sheets

(56) References Cited

U.S. PATENT DOCUMENTS

| | | | | | |
|---|---|---|---|---|---|
| 712,075 | A | * | 10/1902 | Knight | E04G 21/22 52/749.14 |
| 1,736,812 | A | * | 11/1929 | Youngblood | E04G 21/22 294/62 |
| 1,833,582 | A | * | 11/1931 | Kavanagh | E04G 21/20 401/35 |
| 3,162,886 | A | * | 12/1964 | Wise | E04G 21/20 118/208 |
| 3,325,960 | A | * | 6/1967 | James | E04G 21/22 52/749.14 |
| 3,368,286 | A | * | 2/1968 | Zenke | E04G 21/22 33/518 |
| 3,764,222 | A | * | 10/1973 | Orthman | E04G 21/204 401/261 |
| 3,950,914 | A | * | 4/1976 | Lowen | E04G 21/22 52/749.14 |
| 4,236,367 | A | * | 12/1980 | Wilczynski | E04G 21/204 52/749.14 |
| 4,827,689 | A | * | 5/1989 | Lonardi | F27D 1/1621 52/749.15 |
| 5,284,000 | A | * | 2/1994 | Milne | E04G 21/22 52/749.14 |
| 6,370,837 | B1 | * | 4/2002 | McMahon | E04G 21/20 52/749.14 |
| 8,825,208 | B1 | * | 9/2014 | Benson | E04F 21/02 700/245 |
| 10,689,864 | B2 | * | 6/2020 | Parkes | E04G 21/22 |
| 2009/0038258 | A1 | * | 2/2009 | Pivac | B25J 9/162 52/749.14 |
| 2012/0053726 | A1 | * | 3/2012 | Peters | B25J 15/0019 700/252 |
| 2018/0162655 | A1 | * | 6/2018 | Slavinski | B65G 47/086 |

\* cited by examiner

SYSTEM AND METHOD FOR CONSTRUCTING A BRICK STRUCTURE WITH A CABLE-DRIVEN ROBOT

CROSS-REFERENCE TO RELATED APPLICATION

This application claims the priority benefit of U.S. Provisional Application Ser. No. 62/774,953, filed Dec. 4, 2018, which is incorporated herein by reference in its entirety.

FIELD OF THE INVENTION

The present invention pertains to a robotic constructing system that can be configured to build a brick structure using a cable-driven robot. More specifically, the invention pertains to a robotic constructing system and apparatuses that are capable of positioning and applying adhesive to bricks and position the bricks in a three-dimensional (3-D) space to construct a brick structure, particularly, of large dimensions.

BACKGROUND OF THE INVENTION

Bricks and brick laying have been a part of architecture and building technology for centuries. The industry relies on intensive specialist on-site labor. The industry is under pressure in many parts of the world as labor forces and costs of manual labor are skyrocketing.

Different machinery and tools have been developed to assist workers in brick laying, making the process more automatic and relying less on human efforts. However, labor forces still take a leading role in supplying adhesive, loading bricks, and transporting machinery.

Recently, the development of cable-driven robots has been adapted to take the place of laborers for 3D space positioning. Cable-driven robots offer several advantages over existing methods including high-transportability, reconfigurability, and ability to operate in large spaces. Conventional techniques utilize a robot arm that can reach up to 5 meters for reaching the wall completely, however the robot is usually large in scale and hard to transport.

Another drawback of the existing machinery is that it is only good for a long wall. Particularly, walls with complex laying pattern or curvy designs are difficult to construct. Therefore, automated systems that allow construction of wider range of architectural designs are desired.

BRIEF SUMMARY OF THE INVENTION

The present invention pertains to a robotic constructing system comprising a cable-driven robot that can be configured to construct brick structures. The robotic constructing system also comprises a robot arm and an adhesive dispensing system. The robotic constructing system is capable of placing and gluing bricks for a rigid bricks structure. The robot arm can be configured to handle different types or sizes of bricks as the robotic constructing system requires. As the adhesive dispenser and brick slider are within the reach of the robot arm, a brick is then brought to the dispenser and moved to the brick slider, ready to be positioned by the cable-driven robot.

The robotic constructing system of the subject invention can perform end-to-end brick laying procedures, comprising gluing and loading the brick onto the cable-driven robot system. The entire process can be more automated than conventional methods and requires lesser human effort. Also, the robotic constructing system has a good scalability and portability, which can easily adapt with different workspace and can easily fit into different environments. Also, compared to traditional mobile serial robot combinations, the robot footprint of the robotic constructing system of the subject invention is much larger for covering a larger workspace.

In certain embodiments, the robotic constructing system applies linear rail on each pole, which allows reconfigurable workspace control in real time. The linear rail can be configured to drive the bottom level actuating unit up and down, thereby making the workspace reachable by an indexing end-effector. This also inhibits cables from colliding with built structure and avoids interference between obstacles inside a workspace.

BRIEF DESCRIPTION OF THE DRAWINGS

Some embodiments of the present invention are illustrated examples and are not limited by the figures of the accompanying drawings, in which like references may indicate similar elements and in which:

FIG. 5A shows the actuator, such as a motor, of the linear bearing and an adaptor transporting the brick in vertical direction. FIG. 5B illustrates the overall linear rail system.

FIG. 6A depicts a perspective view of the cable actuating unit, while FIG. 6B shows the structure of a cable outlet of the cable actuating unit.

FIG. 7A shows a perspective view of the brick loading system that comprises a linear rail that allows a loading gripper to move vertically, and FIG. 7B shows the loading gripper.

DETAILED DISCLOSURE OF THE INVENTION

Figure 1:
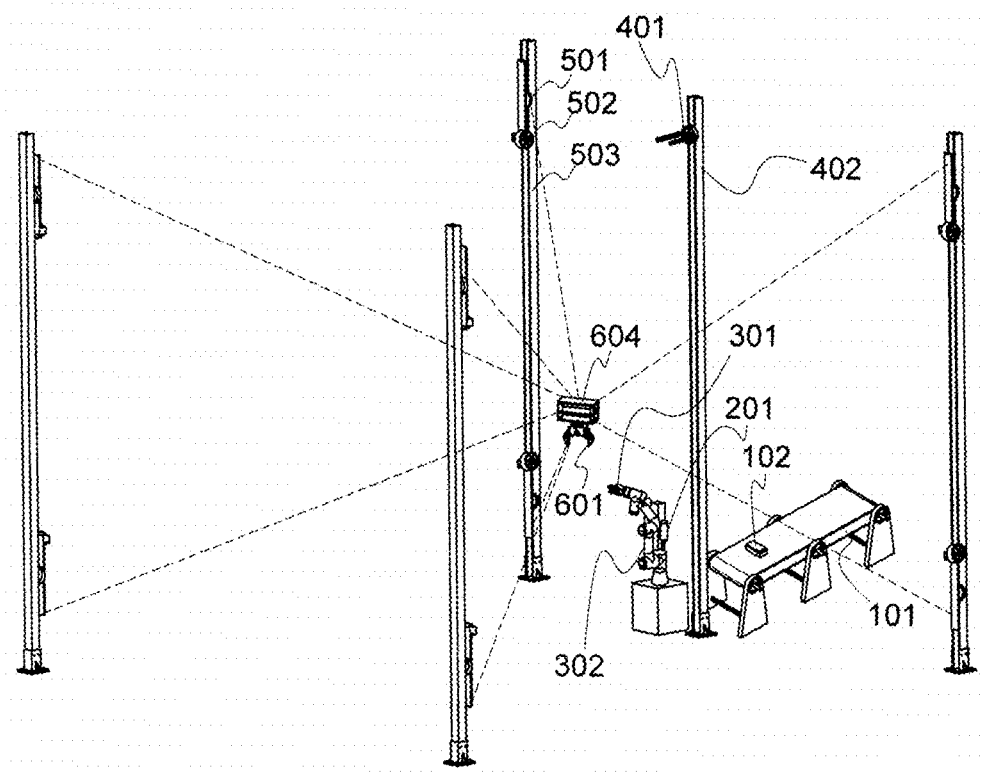
FIG. 1 illustrates a perspective view of the robotic constructing system comprising a cable-driven robot system, an adhesive dispenser, and a brick loading system, according to an embodiment of the subject invention.

The terminology used herein is for the purpose of describing particular embodiments only and is not intended to be limiting of the invention. As used herein, the term "and/or" includes any and all combinations of one or more of the associated listed items. As used herein, the singular forms "a," "am," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New brick laying devices, apparatuses, and methods for positioning bricks in 3D space are disclosed herein. In the following description, for purposes of explanation, numerous specific details are set forth to provide a thorough understanding of the present invention. It will be evident, however, to one skilled in the art that the present invention may be practiced without these specific details.

A "brick structure" as used in this disclosure refers to a structure comprising an arrangement of a plurality of bricks. Typically, a brick structure is an architectural structure, such as a wall, brick enclosure, house, shed, building, etc. However, a person of ordinary skill in the art can recognize that the systems and methods disclosed herein can be used in constructing any structure comprising a plurality of repeating units. Accordingly, the size and shape of the brick, i.e., the repeating unit, can vary depending on the specific application. Typically, a brick is a solid rectangle; however, a brick can have any suitable shape, such as, triangular prism, hexagonal prism, octagonal prism, cylinder, or a combination of bricks having different shapes and sizes. Bricks can also have processes for engaging with adjacently placed bricks. A person of ordinary skill in the art can design appropriate shapes and sizes for particular applications and such embodiments are within the purview of the invention.

The present disclosure is to be considered as an exemplification of the invention and is not intended to limit the invention to the specific embodiments illustrated by the figures or the description below.

The present invention will now be described by referencing the appended figures representing preferred embodiments. FIG. 1 depicts an isometric view of the robotic constructing system that is based on the cable-driven robot for constructing a brick structure according to various embodiments of the subject invention.

In preferred embodiments, the robotic constructing system comprises a cable-driven robot system, an adhesive dispensing system dispensing an adhesive, and a brick loading system. An object such as a brick 102 is provided by an external conveyor 101 to a range of a robot arm 302 of the brick loading system. The capturing gripper 301 of the brick loading system picks up the brick 102 and completes a sequence of actions to apply the adhesive on a surface of the brick 102 by the robot arm 302. The robot arm 302 then moves and places the brick 102 onto the loading gripper 401, where the brick 102 can be brought up by a first linear rail 402. The cable-driven robot system picks up the brick from the loading gripper 401 by the placing gripper 601 of the cable-driven robot system. The movements of the placing gripper 601 are controlled by one or more cable actuating units 501.

Each of the cable actuating units 501 is mounted on a second linear rail 503, and the length of the cable connecting the cable actuating unit 501 and indexing end-effector 604 is configured and controlled by one of a plurality of hauling devices, such as winches, 502. With synchronized motions of a plurality of, for example, eight cable actuating units 501 of the robotic constructing system, the placing gripper 601 can reach any location within proximity of the second linear rails 503. The brick 102 is then moved from the loading gripper 401 to a designated location of the 3-D space for constructing the brick structure. The indexing end-effector 604 can be connected with the plurality of, for example, eight, cables of the plurality of cable actuating unit 501 which controls the cable length to determine the position of the indexing end-effector 604.

Figure 2A:
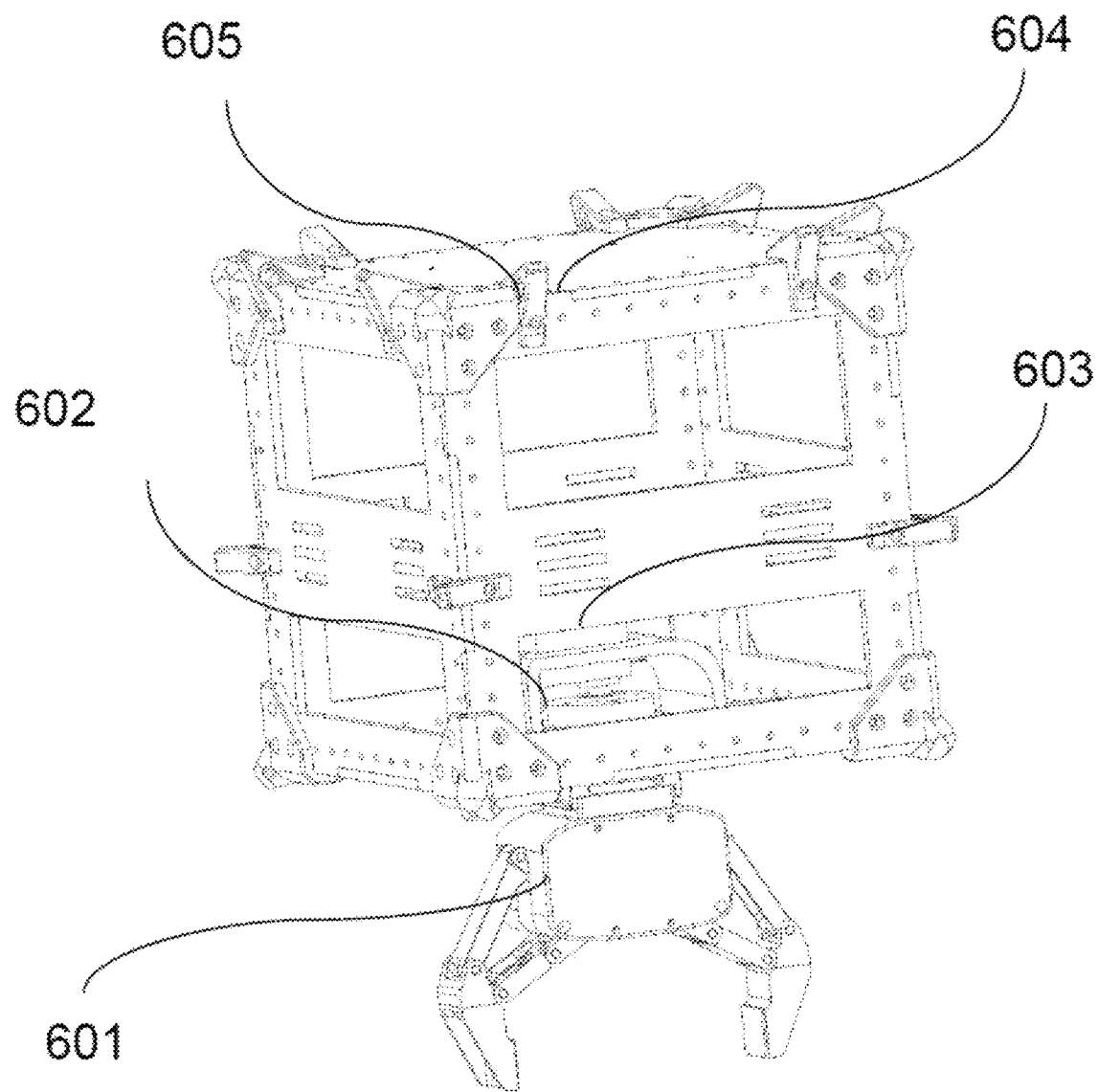
FIG. 2A shows an indexing end-effector of the cable-driven robot system, according to an embodiment of the subject invention.
Figure 2B:
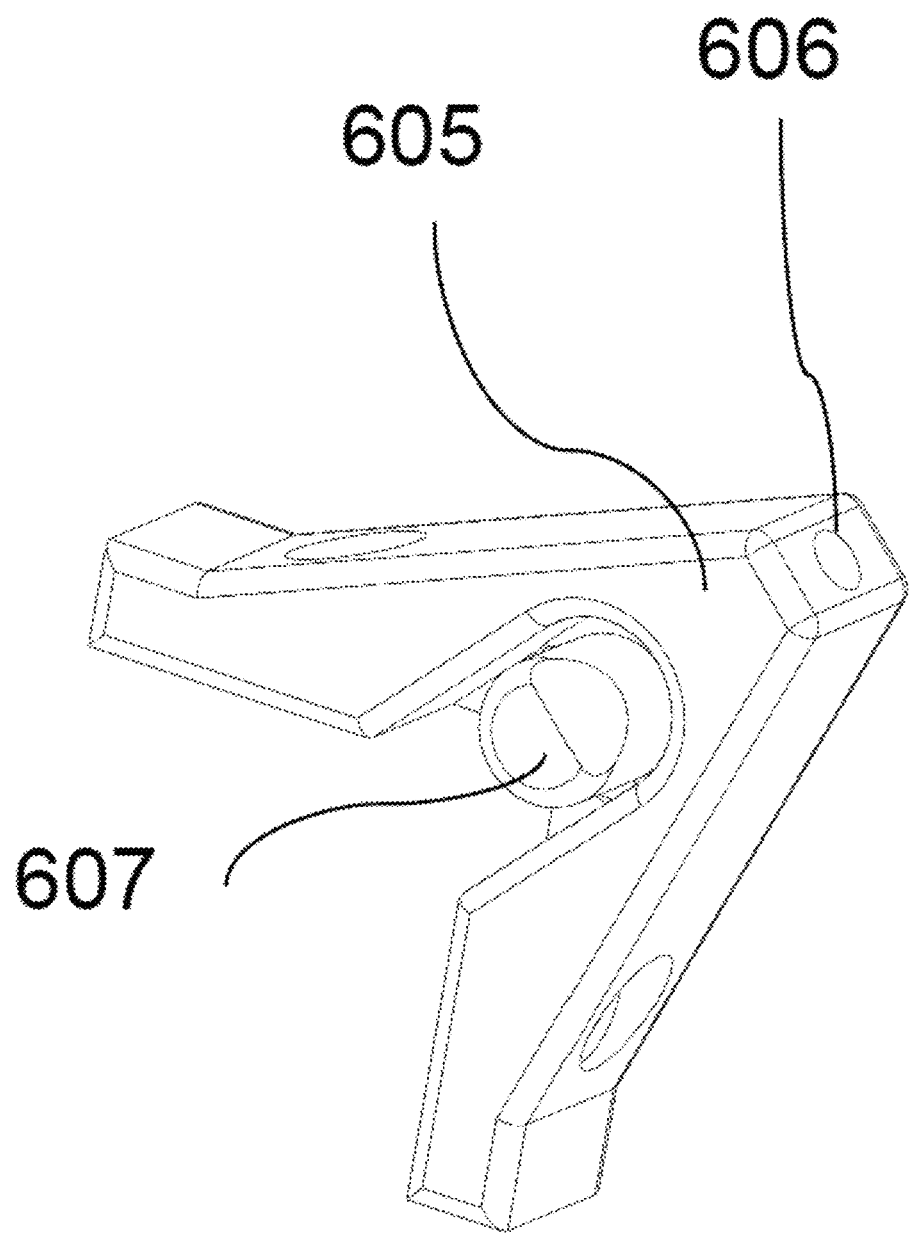
FIG. 2B shows a perspective view of an adaptor of the indexing end-effector, according to an embodiment of the subject invention.

The plurality of cables can be attached to a first adaptor 605 of the indexing end-effector 604 using bowline knot and attached at a hook 607 as shown in FIGS. 2A and 2B. The cables go through a hole 606 and are attached to the adaptor 605, allowing the indexing end-effector 604 to control the movements of the cables when a force of tension is applied to the cables. The placing gripper 601 can be interchanged with other tools for other procedures and applications when necessary and, therefore, the indexing end-effector 604 is capable of performing actions on a variety of cable-driven devices.

Figure 3:
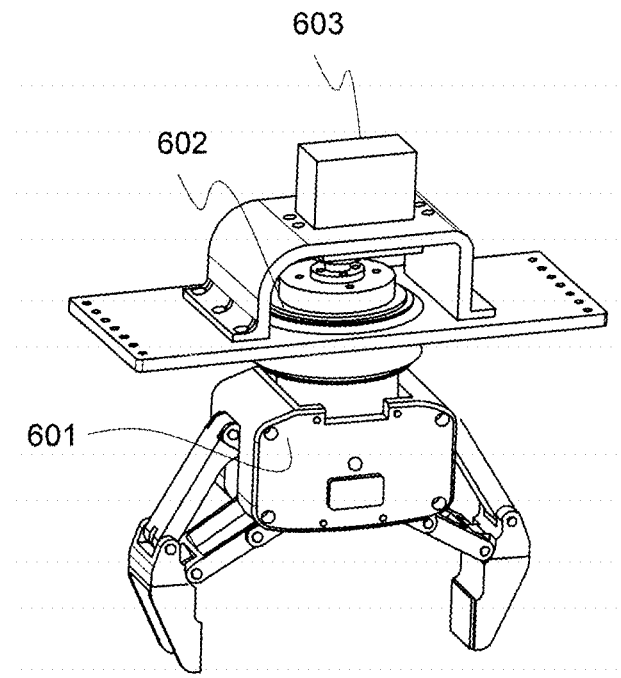
FIG. 3 shows the placing gripper connected to a rotary actuator such as a servo motor that rotates the entire placing gripper at a desired angle in a yaw direction, wherein the placing gripper comprises a first bearing carrying weights of the placing gripper and the brick, according to an embodiment of the subject invention.
Figure 4:
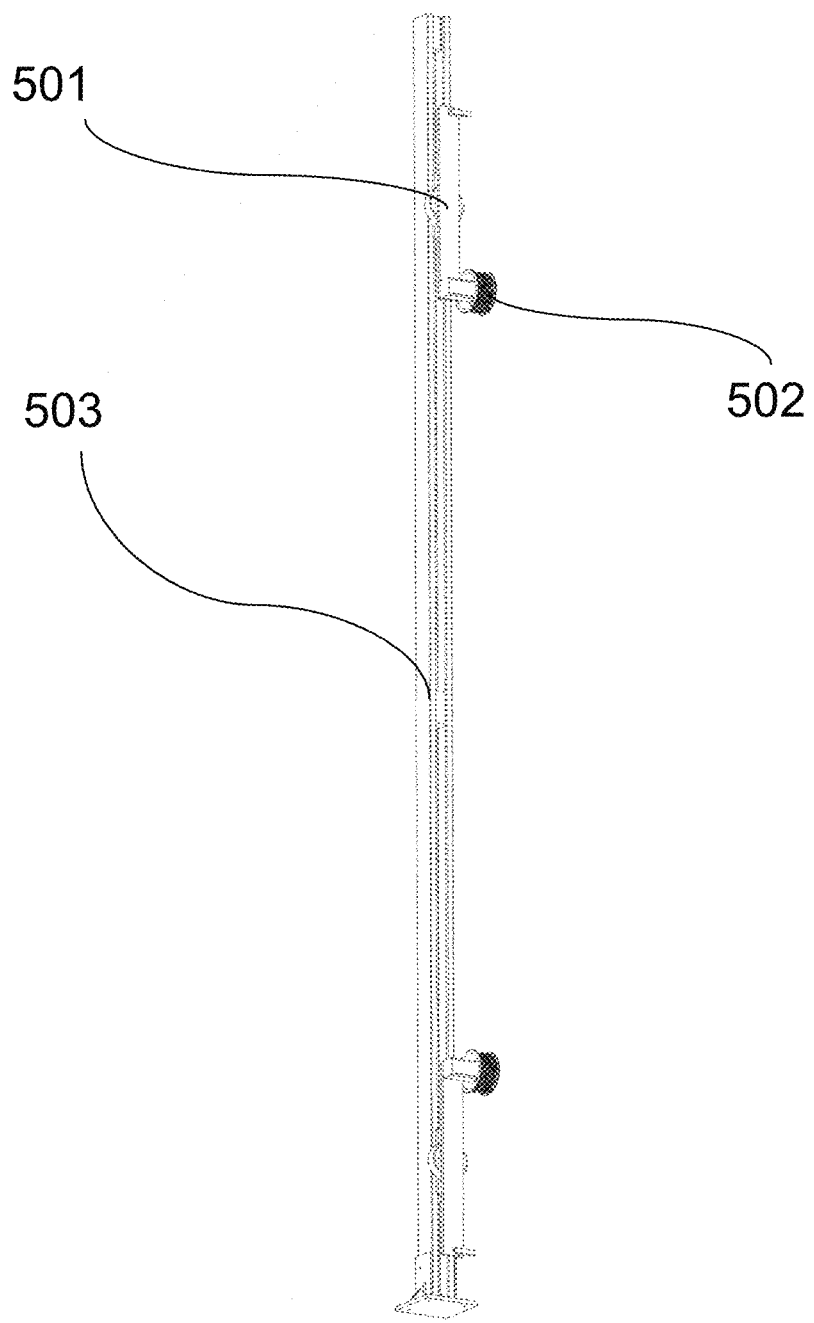
FIG. 4 illustrates a cable actuating device of the cable-driven robot system, wherein the cable actuating device includes a plurality of cable actuating units, a linear rail, and a plurality of winches, according to an embodiment of the subject invention.

In preferred embodiments, the placing gripper 601 in FIG. 3 allows a rotation along a yaw direction, making it possible to place the brick 102 at different angles. This is achieved by a rotary actuator, such as a servo motor 603 for rotating the angle of the placing gripper 601.

The axis of rotation is collinear to a shaft of the rotary actuator such as the servo motor 603, with a first bearing 602 for bearing the payload or weights of the placing gripper 601 and the brick 102.

The placing gripper 601, the first bearing, and the rotary actuator 603 in FIG. 3 can be securely attached to a bottom surface of the indexing end-effector 604, as shown in FIG. 2A.

Figure 5A:
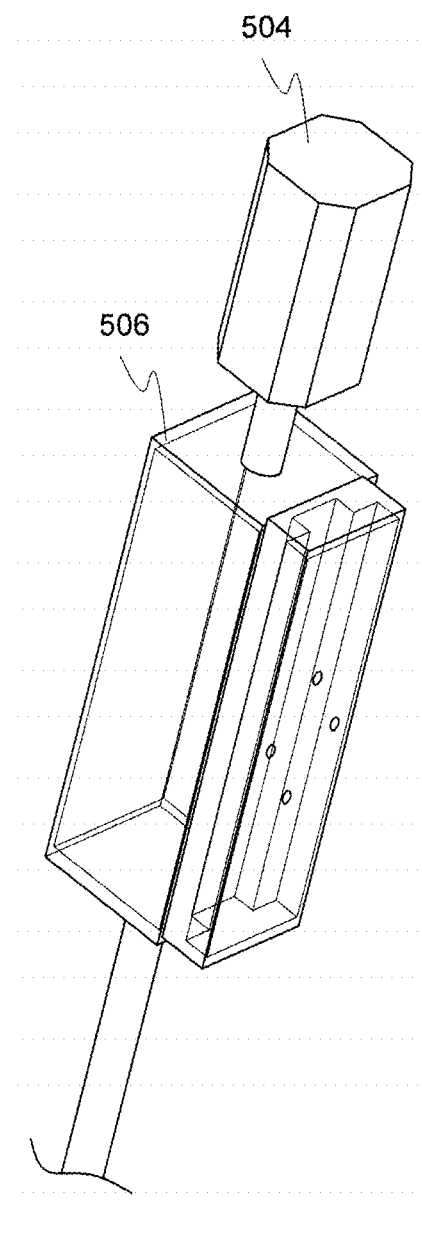
FIGS. 5A and 5B illustrate a single column of a linear rail system of the robotic constructing system, wherein the linear rail system includes a threaded rod, an adaptor, and a motor, according to an embodiment of the subject invention.
Figure 5B:
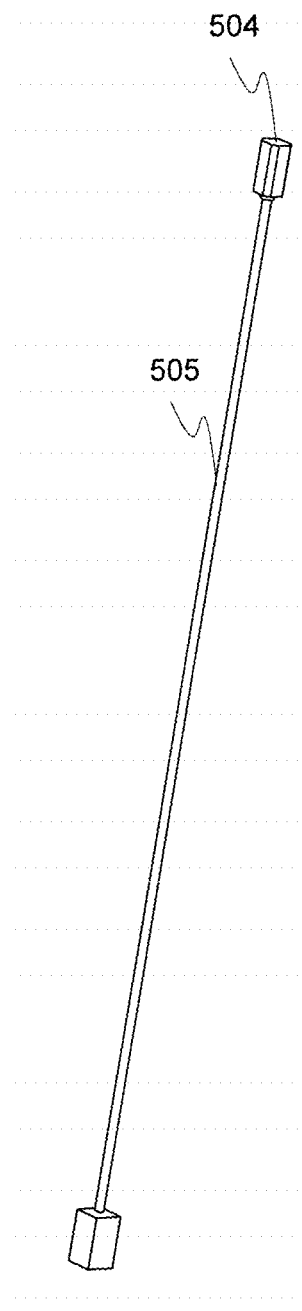

In preferred embodiments of the subject invention, the robotic constructing system of FIG. 1 comprises a plurality of linear rails 503 of FIG. 5A, 5B. The linear rails 503 in FIG. 5B can comprise a threaded metal rod 505 connected with a second adaptor 506, travelling up and down by controlling the movement of a motor 504.

The linear rails 503 in FIG. 5B can be implemented in both the cable actuating unit 501 and the brick loading system.

Figure 6A:
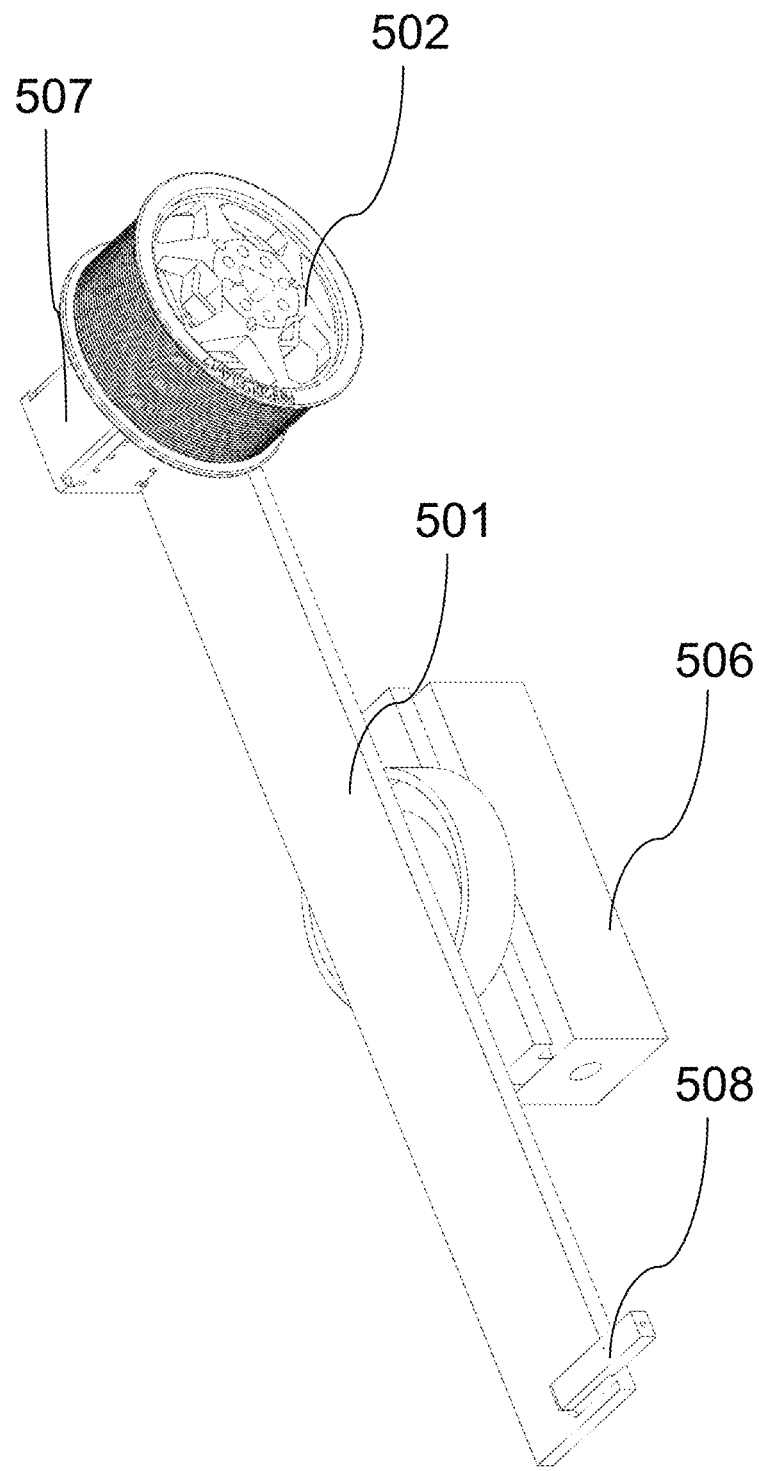
FIGS. 6A and 6B illustrate a cable actuating unit, according to an embodiment of the subject invention.

As shown in FIG. 6A, the cable actuating unit 501 can be connected to the second adaptor 506 for adapting on the linear rails 503. The cable actuating unit 501 comprises a pulley 502 that is directly actuated by the motor 507. The cable is winched on the pulley 502 and may travel through a cable outlet 508.

Figure 6B:
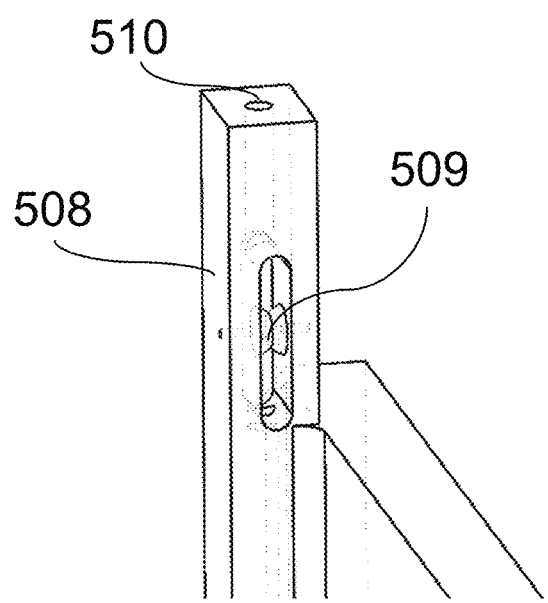

In FIG. 6B, the cable outlet 508 comprises a second bearing 509, which allows the cable to turn by a predetermined angle, including but not limited to, 90 degrees, and penetrate through a hole 510 of the cable outlet 508.

Figure 7A:
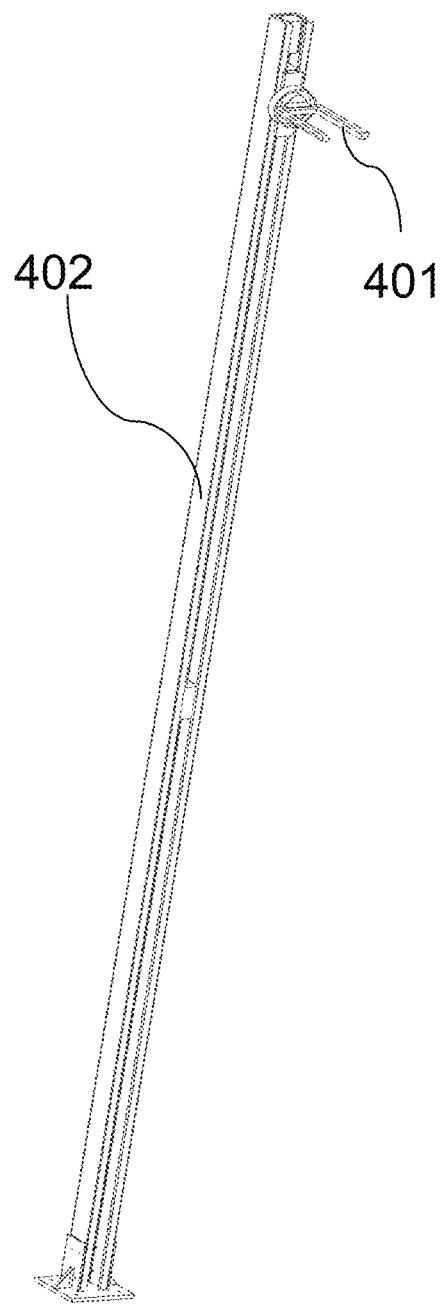
FIGS. 7A and 7B illustrate the brick loading system, according to an embodiment of the subject invention.
Figure 7B:
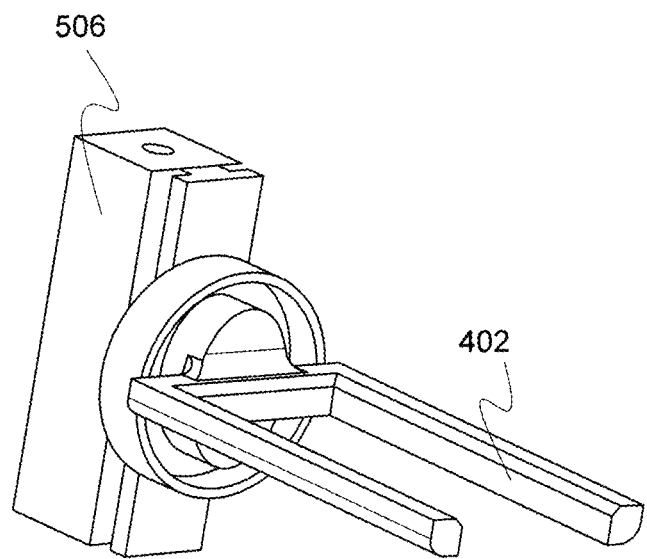

In preferred embodiments of the subject invention, the robotic constructing system comprises a brick loading system as shown in FIG. 7A. The brick loading system comprises a linear rail 402 shown in FIGS. 5A and 5B, a loading gripper 401, and the second adaptor 506. After applying the adhesive onto the brick surfaces, the robot arm 302 of FIG. 10 can grip and place the brick 102 onto the loading gripper 401.

Figure 10:
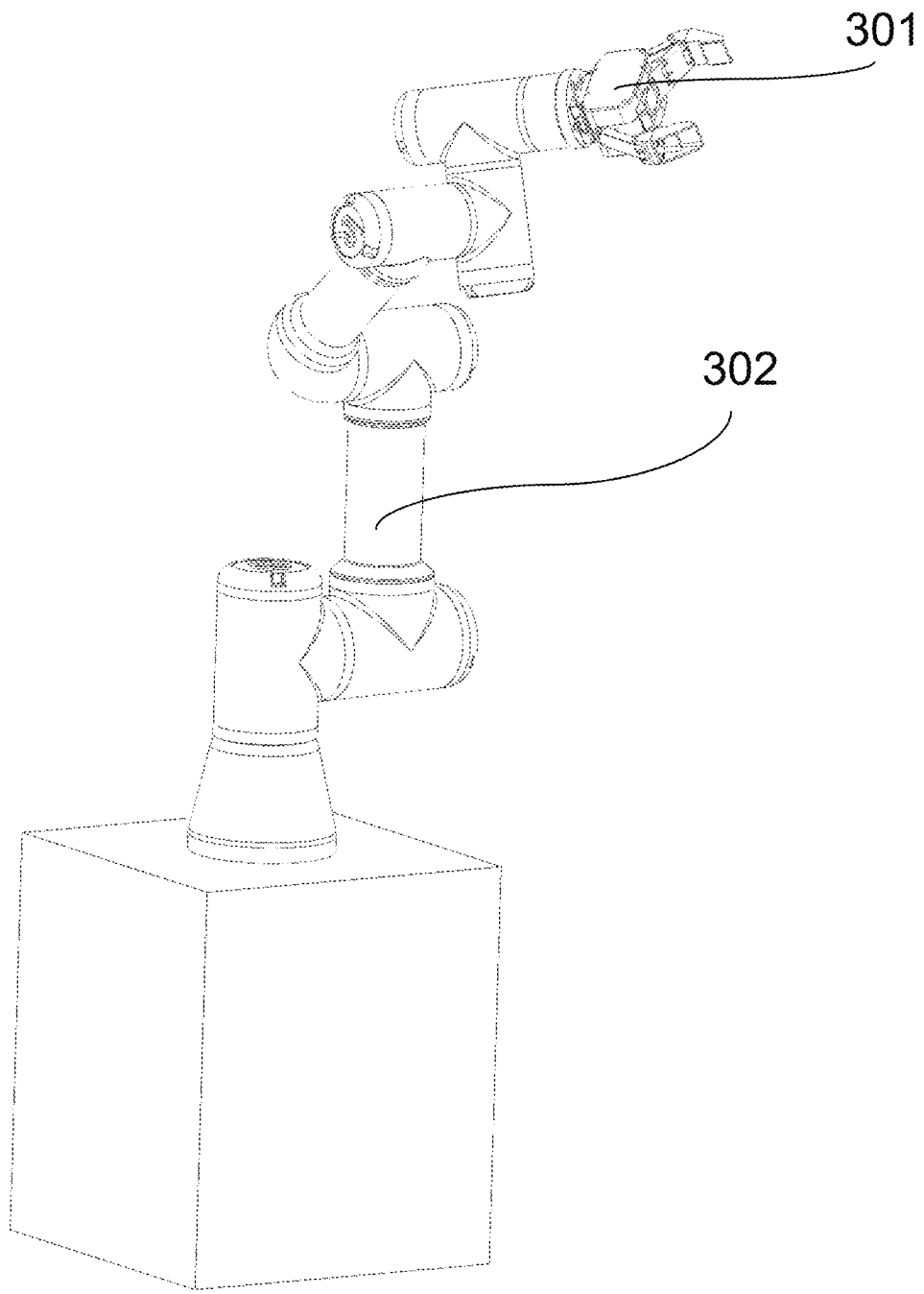
FIG. 10 illustrates a robot arm of the robotic constructing system having a capturing gripper mounted at a tip of the robot arm, according to an embodiment of the subject invention.

In FIG. 10, the shape of the loading gripper 401 allows the adhesive side of the brick 102 pointing downward, while gripping the bottom edge of the brick 102. Then, the placing gripper 601 can grip the brick from the top. The brick loading system can raise the brick 102 to the working level required by the cable-driven robot system, such that the cable-driven robot system can pick and lay the brick to a desirable position.

Figure 8:
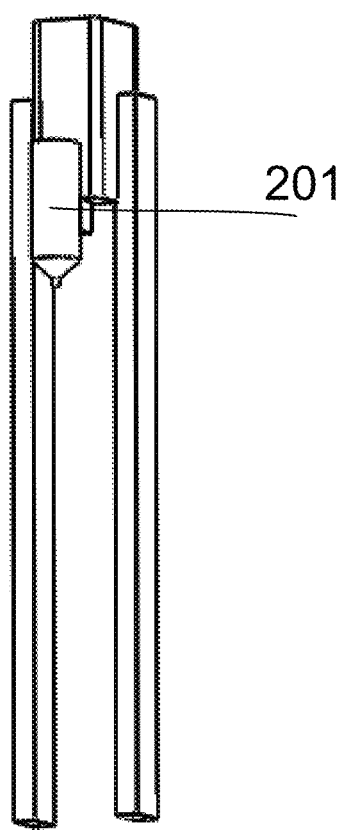
FIG. 8 shows the adhesive dispenser receiving an adhesive from a source (not shown) and dispensing the adhesive to surfaces of the brick, according to an embodiment of the subject invention.
Figure 9:
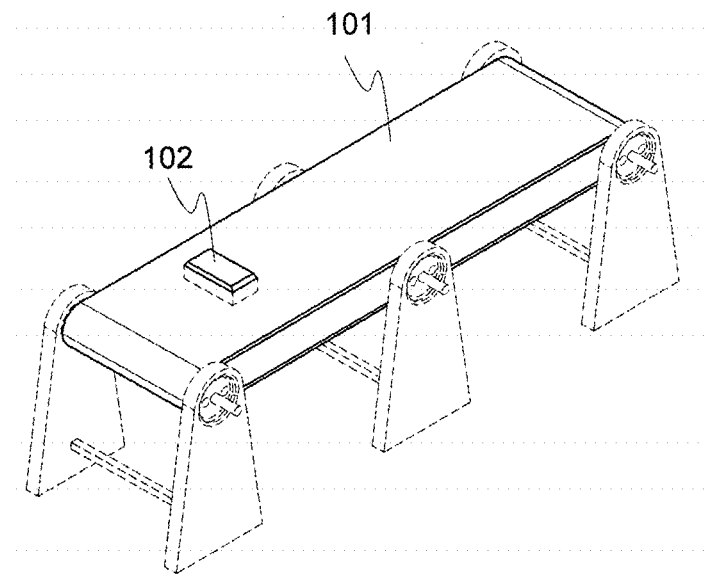
FIG. 9 shows a conveyor belt that transports the brick, according to an embodiment of the subject invention.

The adhesive dispenser 201, the external conveyor 101, and robotic arm 302 with the capturing gripper 301 as in FIG. 8-10 can be present at a ground level. The brick 102 is fed into the robotic constructing system by the external conveyor 101, with the capturing gripper 301 installed on the robot arm 302, which can be configured to pick up the brick 102. The robot arm 302 can then move the bottom side of brick towards the adhesive dispenser 201. The dispenser will dispense the adhesive as the robot arm 302 moves the brick and apply the adhesive to the surface of the brick 102. Simultaneously, the loading gripper 401 can be lowered to a location to be reachable by the robot arm 302, and the brick 102 will be transported to the brick loading system.

The entire process described herein can be repeated for a plurality of bricks until the brick structure is completed.

Accordingly, the invention provides the following non-limiting embodiments:

Embodiment 1

A robotic constructing system for constructing a structure comprising bricks, the system comprising a bricks transporting system, a robot-arm, an adhesive dispenser, a brick loading apparatus, and a cable-driven robot.

Embodiment 2

The robotic constructing system of embodiment 1, wherein the bricks transporting system comprises a conveyer that transports the bricks to the robot arm.

Embodiment 3

The robotic constructing system of embodiment 1 or 2, wherein the robot arm comprises a capturing gripper configurable to pick up the bricks from the bricks transporting system and configurable to place the bricks in a position to receive an adhesive from an adhesive dispenser, wherein the adhesive dispenser is configurable to place the adhesive on the bricks.

Embodiment 4

The robotic constructing system of any of embodiments 1 to 3, wherein the brick loading apparatus comprises a loading gripper and a linear rail system.

Embodiment 5

The robotic constructing system of embodiment 4, wherein the robot arm is configurable to place the bricks comprising the adhesive onto the loading gripper.

Embodiment 6

The robotic constructing system of embodiment 5 or 6, wherein the linear rail system of the brick loading apparatus is configurable to provide the bricks to the cable-driven robot.

Embodiment 7

The robotic constructing system of any of embodiments 1 to 6, wherein the cable-driven robot comprises an indexing end-effector connected to a plurality of cables.

Embodiment 8

The robotic constructing system of embodiment 7, wherein each of the plurality of cables is attached to a cable actuating unit, wherein each of the plurality of the cable actuating units is configurable to control the length of the corresponding cable, and wherein the plurality of the cable actuating units is configurable to control the position of the indexing end-effector.

Embodiment 9

The robotic constructing system of embodiment 7 or 8, wherein the indexing end-effector comprises a placing gripper configurable to pick up the bricks from the loading gripper.

Embodiment 10

The robotic constructing system of embodiment 9, wherein the placing gripper is configurable to place the bricks in a three-dimensional position.

Embodiment 11

A method for constructing a structure comprising bricks, the method comprising providing the robotic constructing system of any of claims 1 to 10 and configuring and/or operating the robotic constructing system to construct the structure comprising bricks.

Embodiment 12

The method of embodiment 11, comprising providing bricks to the bricks transporting system.

Embodiment 13

The method of embodiment 11 or 12, comprising configuring the robot arm to pick up the bricks from the bricks transporting system and place the bricks in a position to receive an adhesive from the adhesive dispenser.

Embodiment 14

The method of embodiment 13, comprising configuring the adhesive dispenser to place the adhesive on the bricks.

Embodiment 15

The method of any of embodiments 11 to 14, comprising configuring the robot arm to place the bricks comprising the adhesive onto the loading gripper.

Embodiment 16

The method of any of embodiments 11 to 15, comprising configuring the linear rail system of the brick loading apparatus to provide the bricks to the cable-driven robot.

Embodiment 17

The method of any of embodiments 11 to 16, comprising configuring each of the plurality of cables attached to the cable actuating unit to control the length of the corresponding cable thereby controlling the position of the indexing end-effector.

Embodiment 18

The method of any of embodiments 11 to 17, comprising configuring the placing gripper to place the bricks or carrying other tools for different related procedures in a three-dimensional position by configuring the plurality of cable actuating units to control the position of the indexing end-effector.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A robotic constructing system for constructing a structure formed by objects including bricks, the system comprising:
   a cable-driven robot system having a plurality of adjustable cables configured to adjustably extend or retract in a coordinated fashion to maneuver one of the objects to be positioned in a three-dimensional space;
   an adhesive dispenser; and
   a brick loader;
   wherein the cable-driven robot system comprises an indexing end-effector connected to a plurality of cables.

2. The robotic constructing system of claim 1, wherein the brick loader comprises a robot arm.

3. The robotic constructing system of claim 2, wherein the robot arm comprises a capturing gripper configurable to pick up the one of the objects and configured to place the one of the objects in a position to receive an adhesive from the adhesive dispenser.

4. The robotic constructing system of claim 3, wherein the brick loader comprises a loading gripper and a linear rail.

5. The robotic constructing system of claim 4, wherein the robot arm is configured to place the one of the objects having the adhesive onto the loading gripper.

6. The robotic constructing system of claim 5, wherein the linear rail of the brick loader is configured to provide the one of the objects to the cable-driven robot system.

7. The robotic constructing system of claim 1, wherein each of the plurality of cables is attached to a plurality of cable actuators, respectively, wherein each of the plurality of the cable actuators is configured to control a length of the corresponding cable, and wherein the plurality of the cable actuators is configured to control a position of the indexing end-effector.

8. The robotic constructing system of claim 1, wherein the indexing end-effector comprises a placing gripper configured to pick up the one of the objects from the brick loader.

9. The robotic constructing system of claim 8, wherein the placing gripper is configured to place the one of the objects in a three-dimensional space.

10. A method for constructing a structure comprising bricks, the method comprising providing the robotic constructing system of claim 1 and configuring and/or operating the robotic constructing system to construct the structure comprising bricks.

11. The method of claim 10, further comprising providing the one of the objects to the brick loader.

12. A method for constructing a structure comprising bricks, the method comprising providing the robotic constructing system of claim 2, configuring and/or operating the robotic constructing system to construct the structure comprising bricks, and configuring the robot arm to pick up the one of the objects from the brick loader and place the one of the objects in a position to receive an adhesive from the adhesive dispenser.

13. The method of claim 12, further comprising configuring the adhesive dispenser to apply the adhesive on a surface of the one of the objects.

14. A method for constructing a structure comprising bricks, the method comprising providing the robotic constructing system of claim 4, configuring and/or operating the robotic constructing system to construct the structure comprising bricks, and configuring the robot arm to place the one of the objects having the adhesive onto the loading gripper.

15. A method for constructing a structure comprising bricks, the method comprising providing the robotic constructing system of claim 4, configuring and/or operating the robotic constructing system to construct the structure comprising bricks, and configuring the linear rail of the brick loader to provide the one of the objects to the cable-driven robot system.

16. A method for constructing a structure comprising bricks, the method comprising providing the robotic constructing system of claim 7, configuring and/or operating the robotic constructing system to construct the structure comprising bricks, and configuring each of the plurality of adjustable cables attached to the plurality of cable actuators to control the length of the corresponding cable for controlling the position of the indexing end-effector.

17. A method for constructing a structure comprising bricks, the method comprising providing the robotic constructing system of claim 8, configuring and/or operating the robotic constructing system to construct the structure comprising bricks, and configuring the placing gripper to place the one of the objects or carrying other tools for different related procedures in a three-dimensional position by configuring the plurality of cable actuators to control the position of the indexing end-effector.

* * * * *